US007733540B2

(12) United States Patent
Moribe

(10) Patent No.: US 7,733,540 B2
(45) Date of Patent: Jun. 8, 2010

(54) MULTIFUNCTION APPARATUS

(75) Inventor: Masato Moribe, Inazawa (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1111 days.

(21) Appl. No.: 11/387,802

(22) Filed: Mar. 24, 2006

(65) Prior Publication Data
US 2007/0223055 A1 Sep. 27, 2007

(51) Int. Cl.
H04N 1/04 (2006.01)

(52) U.S. Cl. .................. 358/474; 358/448; 358/498; 358/296; 347/108; 347/152; 347/170; 271/270; 271/265.01; 399/405; 399/107; 399/113

(58) Field of Classification Search ............ 358/474, 358/1.5, 498, 497, 496, 448, 296; 399/405, 399/495, 107, 113; 271/207, 162, 3.05, 302, 271/270, 265.01; 347/108, 152, 170, 22, 347/263
See application file for complete search history.

(56) References Cited

U.S. PATENT DOCUMENTS

| 5,953,135 | A  | * | 9/1999  | Tomoe et al. | 358/498 |
| 6,208,828 | B1 | * | 3/2001  | Awai et al. | 399/361 |
| 6,353,727 | B1 | * | 3/2002  | Muraoka et al. | 399/410 |
| 6,961,152 | B1 | * | 11/2005 | Watanabe et al. | 358/296 |
| 7,425,064 | B2 | * | 9/2008  | Koga | 347/108 |
| 2003/0206224 | A1 | * | 11/2003 | Sakakibara et al. | 347/108 |
| 2006/0056875 | A1 | * | 3/2006  | Karasawa et al. | 399/107 |
| 2006/0083542 | A1 | * | 4/2006  | Ito | 399/107 |
| 2006/0114523 | A1 | * | 6/2006  | Ono | 358/474 |
| 2009/0212488 | A1 | * | 8/2009  | Hashimoto et al. | 271/226 |

FOREIGN PATENT DOCUMENTS

| EP | 1 098 505 A2 | 5/2001 |
| EP | 1 289 250 A2 | 3/2003 |
| JP | 2000-019660 | 1/2000 |

OTHER PUBLICATIONS

International Search Report dated in Oct. 9, 2007 in PCT Application No. PCT/US2007/007397.
Written Opinion of the International Searching Authority dated Oct. 9, 2007 in PCT Application No. PCT/US2007/007397.

* cited by examiner

Primary Examiner—Negussie Worku
(74) Attorney, Agent, or Firm—Banner & Witcoff, Ltd

(57) ABSTRACT

A multifunction apparatus is provided with a printer unit having a discharge tray disposed on a top face thereof and a scanner unit disposed on the image recording unit with a space being defined between the image reading unit and the discharge tray. The scanner unit has a casing. The casing is provided in the printer unit rotatably about a rear side of the apparatus in such a fashion as to open a front side of the apparatus. The casing has a recessed part formed at a position of a bottom plate thereof and corresponding to the discharge tray. Thus, a recording sheet removal opening opened on a front side of the apparatus is formed. A reinforcing portion recessed in such a fashion as to be swollen toward an internal space of the casing is formed on the bottom plate having the recessed part.

6 Claims, 7 Drawing Sheets

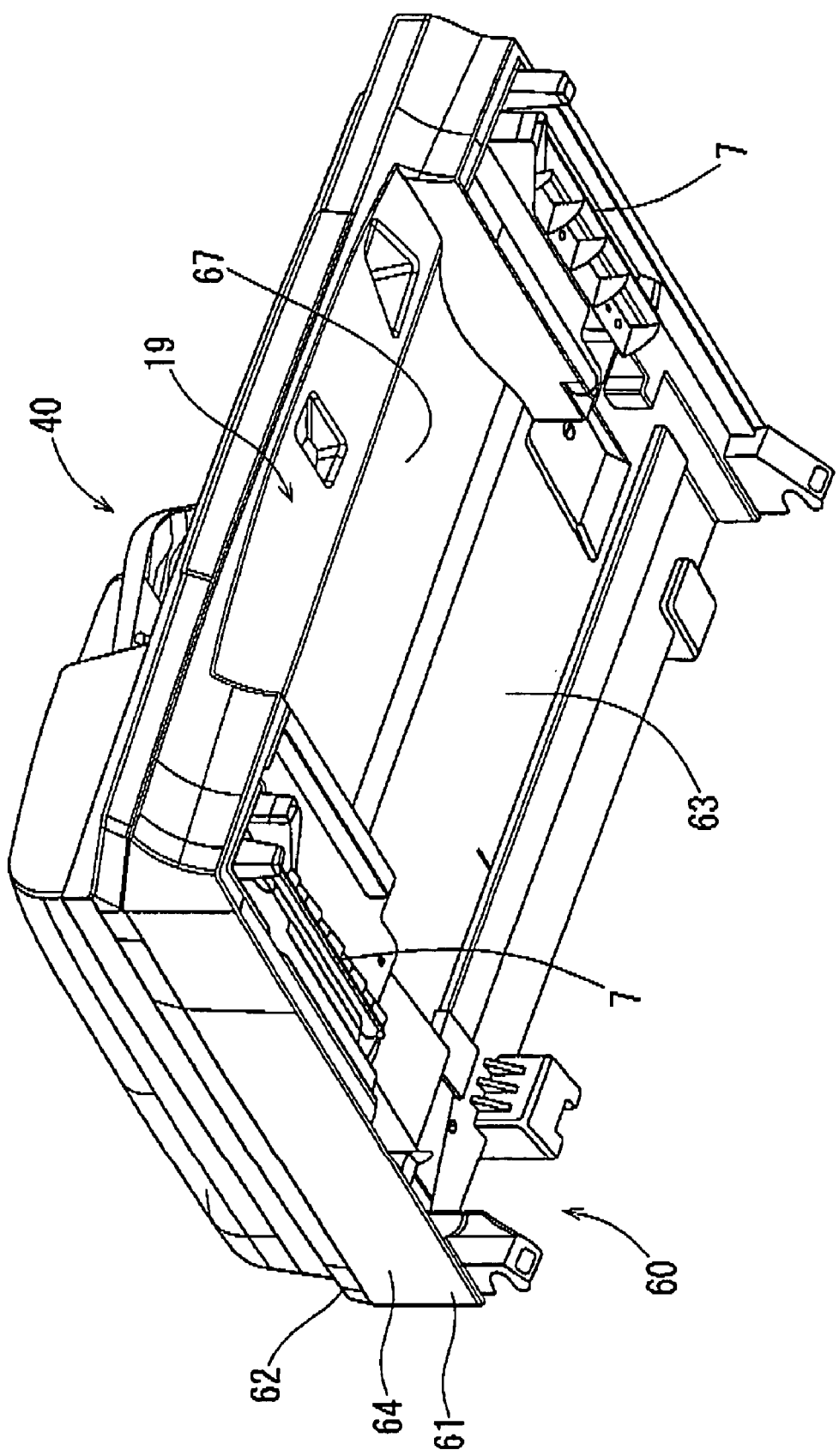

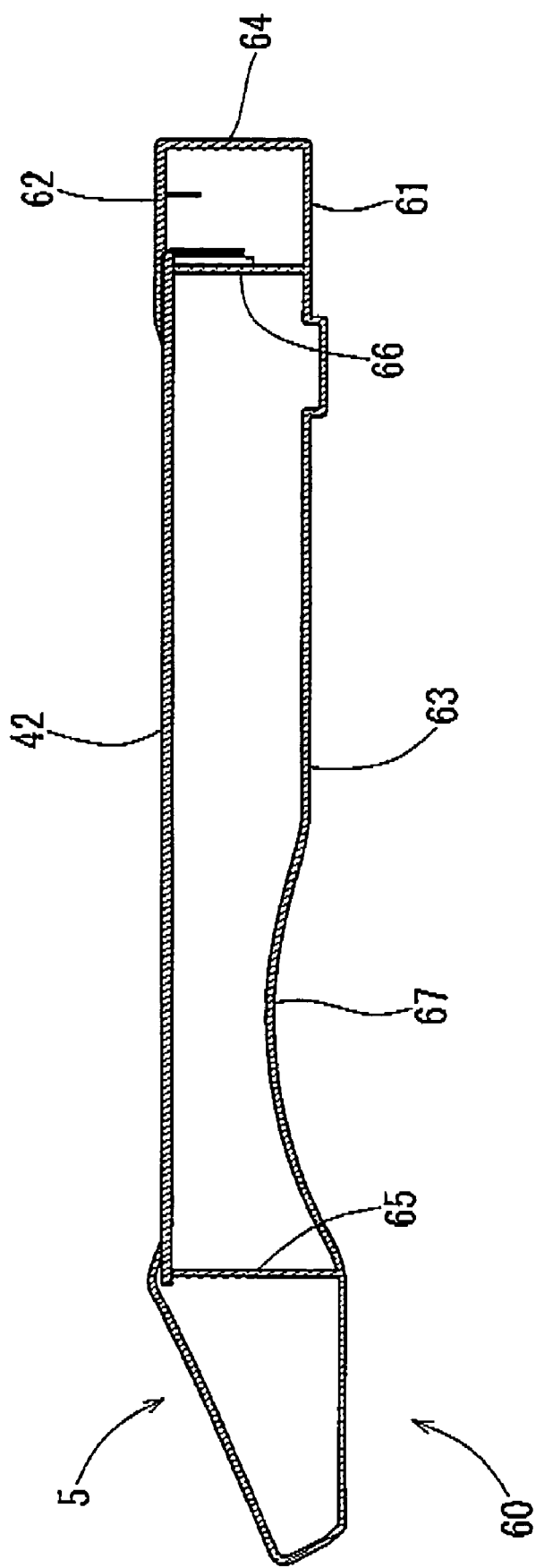

MULTIFUNCTION APPARATUS

BACKGROUND

1. Field of the Invention

Aspects of the invention relate to a multifunction apparatus provided with an image recording unit having a discharge tray disposed on a top face thereof and an image reading unit disposed on the image recording unit.

2. Description of Related Art

Multifunction apparatuses in general are provided with a printer unit for recording an image on a recording sheet and a scanner unit for reading an image of a document. Some of the multifunction apparatuses have a facsimile function and a card reader function. The printer unit is provided with a sheet feed cassette for housing recording sheets, a discharge tray for retaining recording sheets on which images are recorded, a transfer path for transferring the recording sheets from the sheet feed cassette to the discharge tray, and an image recording engine for recording images on the recording shoots in the transfer path. The scanner unit is an FBS (Flatbed Scanner) for reading an image of a document by the use of an image sensor such as a CIS (Contact Image Sensor) and a CCD (Charge Coupled Device) which reciprocates along a platen glass.

The printer unit is connected to a computer or the like to perform image recording based on print data sent from the computer. In the case of using the printer unit, a user inputs an instruction for printing a desired text or image to the computer. Upon reception of the print instruction input, the computer creates print data to send the print data to the printer unit. Upon reception of the print data by the printer unit, a recording sheet is fed from the sheet feed cassette to the transfer path. Then, the image recording engine records the image on the recording sheet based on the print data. Then, the recording sheet after the image recording is discharged to the discharge tray. The user takes out the image-recorded recording sheet discharged on the discharge tray.

In the case of using the scanner unit, the user opens a document cover to place a document on the platen glass and then closes the document cover to input an instruction of starting reading. When the scanner unit receives the reading start instruction, the image sensor moves along the platen glass to read an image of the document. After the image reading, the user opens the document cover again to collect the document placed on the platen glass. In the case of copying, the image data read by the scanner unit is sent to the printer unit, and then the printer unit performs the image recording on a recording sheet based on the image data in the same manner as described above. After that, the user takes out the image-recorded recording sheet from the discharge tray.

In view of the usages of the printer unit and the scanner unit, it is preferable that the scanner unit is disposed at an uppermost part since the open/close of the document cover and the placement/collection of document are conducted in the scanner unit. Also, in order to downsize an installation space of the multifunction apparatus, it is preferable that the scanner unit and the printer unit are disposed one above the other along a vertical direction and that the sheet feed cassette and the discharge tray of the printer unit do not project in a horizontal direction from the apparatus. From such viewpoints, a structure wherein: the scanner unit is disposed on the printer unit; the scanner unit and the printer unit are disposed with a space being defined therebetween; and the discharge tray is disposed in the space is generally employed.

Since the space for disposing the discharge tray is defined below the scanner unit, a part of a casing of the scanner unit corresponding to the space tends to be changed in shape. For example, a book of a heavy weight is placed on the platen glass of the scanner unit as being opened on the platen glass for image reading in some cases. Since a binding part of the book tends to be detached from the platen glass, the user might press the binding part against the platen glass for the image reading. When the book is pressed against the platen glass, the weight of the book and the pressure applied by the user act as a load on the platen glass and the casing of the scanner unit. When the load is too large, the platen glass and the casing can be deformed or damaged. Therefore, it is necessary for the casing of the scanner unit to have a rigidity which can bare the load.

Because of this, among multifunction apparatuses of the related art, there is that in which a casing support member for supporting the casing of a scanner unit is coupled to an electric equipment housing unit for housing an electric equipment unit by the use of a coupling member to establish a honeycomb shape between the casing support member and the electric equipment housing unit, thereby increasing a rigidity of the casing.

However, in the structure where the discharge tray of the printer unit is disposed below the scanner unit, it is undesirable to dispose a member projecting from an underside of the casing of the scanner unit or a member crossing on the discharge tray since such members interfere a recording sheet to be discharged to the discharge tray.

SUMMARY

In at least one aspect of the present invention, a multifunction apparatus may include: an image recording unit discharging on a discharge tray disposed on a top face thereof a recording medium on which an image has been recorded; and an image reading unit disposed on the image recording unit with a space being defined between the image reading unit and the discharge tray, wherein the image reading unit has a casing having a recording medium removal opening opened on a front side of the apparatus and formed by recessing a part of a bottom plate corresponding to the discharge tray and a reinforcing portion recessed in such a fashion as to be swollen toward an internal space and formed on the bottom plate forming the recording medium removal opening, the casing being provided with the image recording unit rotatably about a rear side of the apparatus in such a fashion as to open a front side of the apparatus.

BRIEF DESCRIPTION OF THE DRAWINGS

FIG. 6 is a perspective view showing an underside of the scanner unit 3.

FIG. 7 is a sectional view showing a vertical section of a casing 60 of a document platform 41.

DETAILED DESCRIPTION

It is noted that various connections are set forth between elements in the following description. It is noted that those connections in general and, unless specified otherwise, may be direct or indirect and that this specification is not intended to be limiting in this respect.

(Illustrative Aspects)

Figure 1:
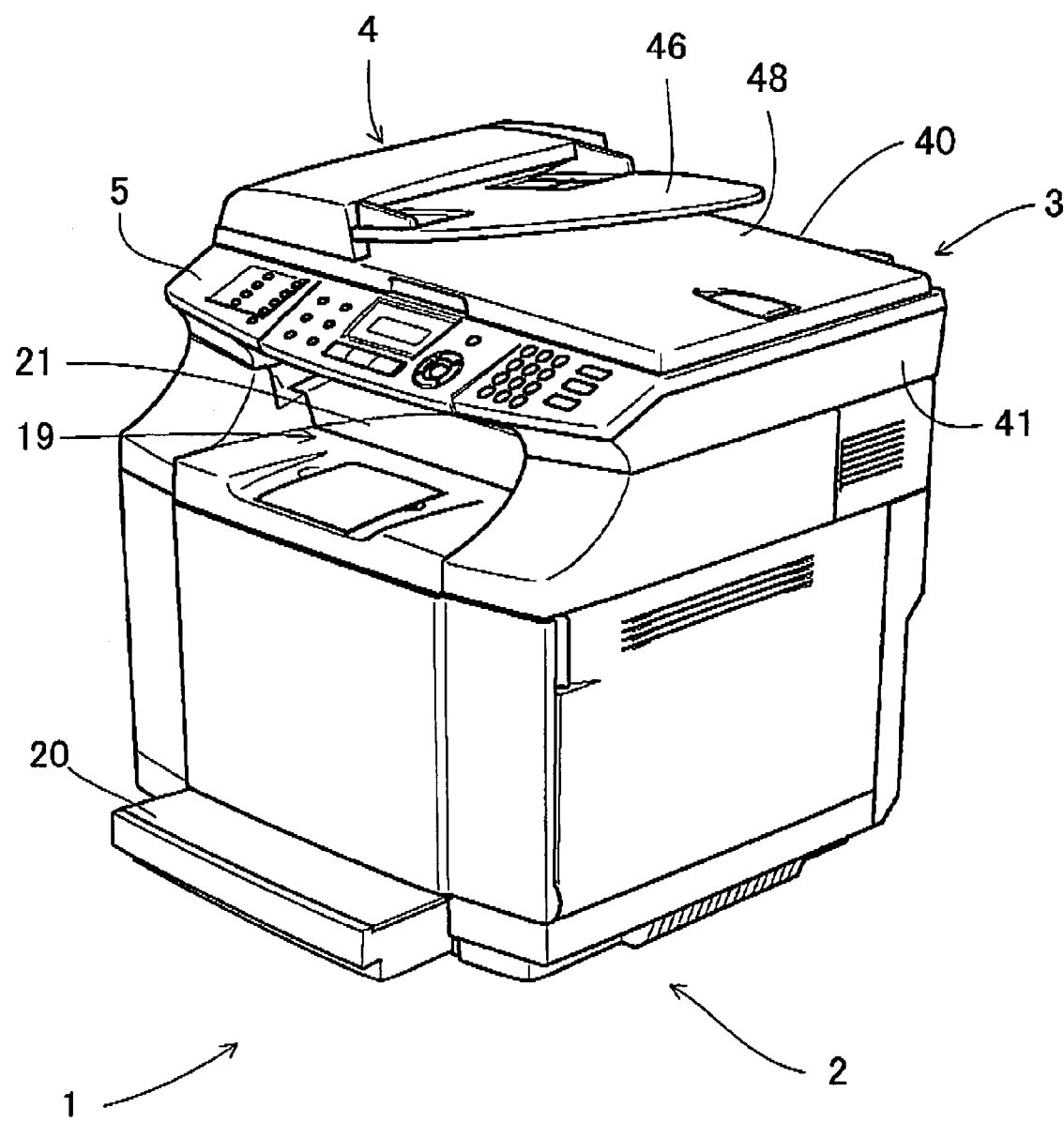
FIG. 1 is a perspective view showing a multifunction apparatus 1 according to at least one illustrative aspect of the invention.

Shown in FIG. 1 is an appearance of a multifunction apparatus 1 according to at least one illustrative aspect of the invention. The multifunction apparatus 1 may have a scanner function, a printer function, and a facsimile function which are provided in an integral fashion. The multifunction apparatus 1 can generally be divided into two units (an upper unit and a lower unit) depending on the functions. The lower part of the multifunction apparatus 1 is a printer unit 2 (image recording unit) for recording an image on a recording sheet. The upper part of the multifunction apparatus 1 is a scanner unit 3 (image reading unit) for reading an image of a document. Structure of the multifunction apparatus 1 described in detail below is one example of the multifunction apparatus 1 according to this invention. It is possible to change the structure of the multifunction apparatus 1 when so required insofar as the scope of this invention is not changed.

In the case of using the multifunction apparatus 1 as a scanner, image data of the document read by the scanner unit 3 are sent to an external computer. In the case or using the multifunction apparatus 1 as a printer, the printer unit 2 prints a text or an image on a recording sheet based on print data sent from the external computer via a printer driver. In the case of using the multi function apparatus 1 as a facsimile, image data of the document read by the scanner unit 3 are electrically transmitted to a telephone line via a facsimile modem. The multifunction apparatus 1 can be connected to external appliances such as a digital camera. In the multifunction apparatus 1 connected to the digital camera, the printer unit 2 records an image on a recording sheet based on image data output from the digital camera. Various recording mediums such as a memory card can be inserted into the multifunction apparatus 1. In the multifunction apparatus 1 into which a recording medium is inserted, the printer unit 2 records an image on a recording sheet based on image data or the like recorded on the recording medium. When the multifunction apparatus 1 receives facsimile data via the telephone line, the printer unit 2 records the facsimile data on a recording sheet.

As shown in FIG. 1, the multifunction apparatus 1 may have an outer shape of a substantially rectangular parallelepiped wherein the scanner unit 3 is disposed on the printer unit 2. A predetermined space may be defined between the printer unit 2 and the scanner unit 3. This space forms a recording sheet removal opening 19 (recording medium removal opening) opened on a front side of the apparatus. A sheet feed cassette 20 is provided on a bottom part of the printer unit 2. A discharge tray 21 is provided on a top face of the printer unit 2. A plurality of recording sheets (recording mediums) are loaded on the sheet feed cassette 20. The recording sheets loaded on the sheet feed cassette 20 are fed to an internal part of the printer unit 2 for image recording, and image-recorded recording sheets are discharged to the discharge tray 21. It is possible to take out the recording sheets discharged to the discharge tray 21 from a front side of the apparatus through the recording sheet removal opening 19. Structure of the internal part of the printer unit 2 will be described later in this specification.

The scanner unit 3 may be a flatbed scanner. A platen glass 42 and an image reader 44 are provided under a document cover 40 (see FIGS. 3 and 4). A document from which an image is to be read is placed on the platen glass 42. The image reader 44 which scans in a direction of a depth of the multifunction apparatus 1 is provided under the platen glass 42. The image reader 44 scans the document G placed on the platen glass 42 to read the image of the document G. An auto document feeder (hereinafter referred to as ADF) 4 is mounted on the document cover 40. The ADF 4 transfers documents sequentially from a document tray 46 to a document discharge tray 48. The image reader 44 reads an image of each of the documents when the document G is passed to the platen glass 43 in the transfer process performed by the ADF 4. Structure of the internal part of the scanner unit 3 will be described later in this specification.

An operation panel 5 for operating the printer unit 2 and the scanner unit 3 is provided at a front part of the top face of the scanner unit 3. The operation panel 5 is provided with various operation buttons and a liquid crystal display unit. The operation buttons include a power button for switching on/off a power of the multifunction apparatus 1, a start button for starting an operation of the printer unit 2 or the scanner unit 3, a stop button for stopping an operation or terminating setting, a mode button for selecting a function among the scanner function, the copying function, the facsimile function, and the like, a dial button for inputting the number of copies, various setting buttons, and the like. When one of the buttons of the operation panel 5 is pushed, a predetermined input is added to a control unit of the multifunction apparatus 1. A current state of the multifunction apparatus 1, an operation guide for users, and the like are displayed on the liquid crystal display unit. The multifunction apparatus 1 is operated by the control unit based also on inputs to the operation panel 5. Of course, when the multifunction apparatus 1 is connected to a computer, the multifunction apparatus 1 is operated based on instructions sent from the computer via a printer driver or a scanner driver as described above.

Figure 2:
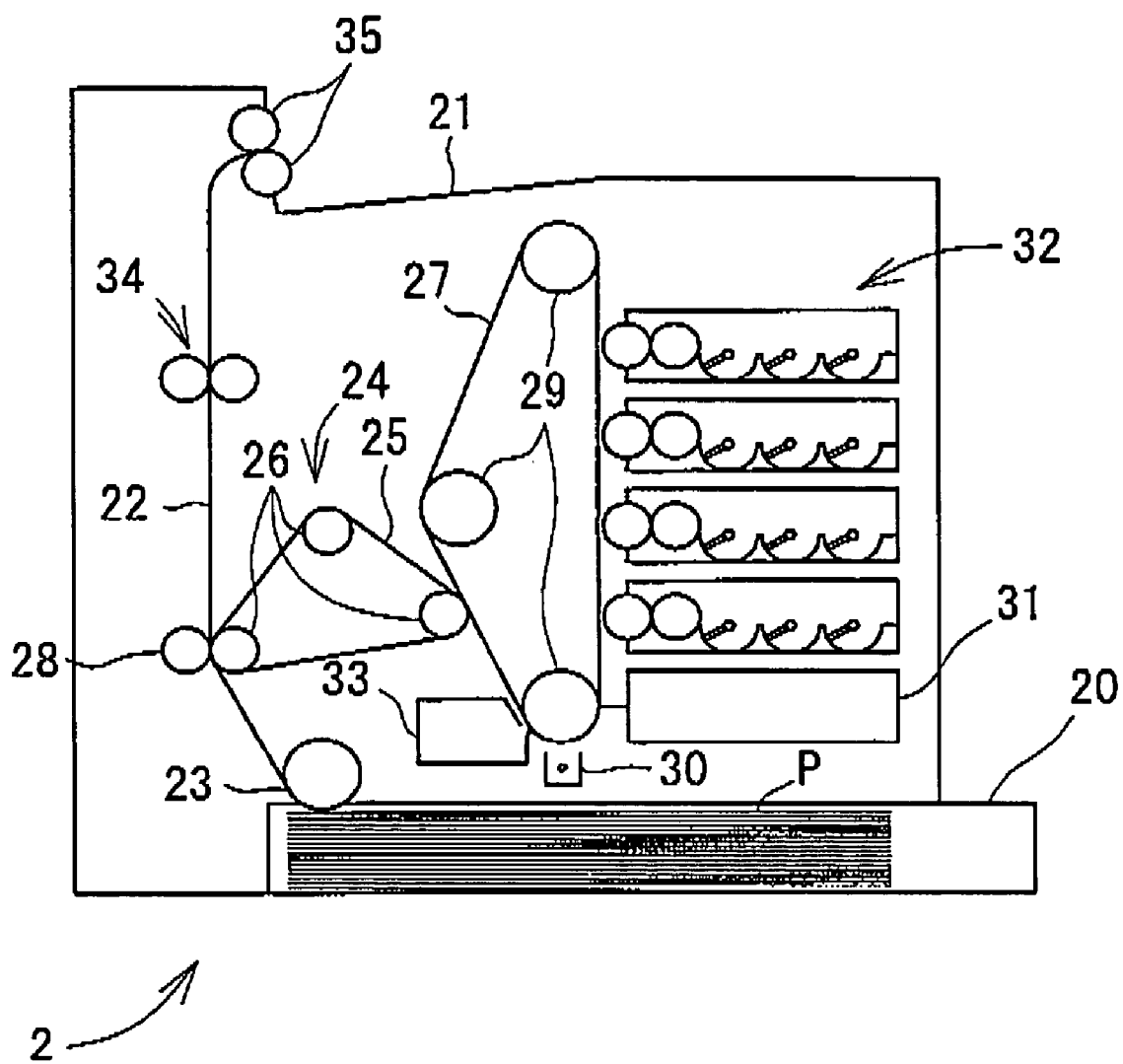
FIG. 2 is a diagram showing an internal structure of a printer unit 2.

FIG. 2 is a diagram showing the internal structure of the printer unit 2. The printer unit 2 performs electrophotographic image formation process. The printer 2 is provided with a sheet transfer path 22 formed continuously from the sheet feed cassette 20 to the discharge tray 21, an intermediate transcription unit 24, electrical chargers 30, a laser scanner 31, a development unit 32, a cleaning unit 33, a transcription roller 28, a fixing unit 34, and discharge rollers 35. Electrical chargers 30, the laser scanner 31, the development unit 32, and the cleaning unit 33 are sequentially disposed around the photosensitive belt 27.

The sheet feed cassette 20 has a thin, flat, and rectangular parallelepiped shape, and the recording sheets P are loaded in an internal space thereof. The sheet feed cassette 20 is detachable from a main body of the printer unit 2 from a front side of the printer unit 2. A user loads the recording sheets P on the sheet feed cassette 20 detached from the printer unit 2 and then attaches the sheet feed cassette 20 to the printer 2.

The sheet transfer path 22 is formed from the sheet feed cassette 20 to the discharge tray 21. The sheet transfer path 22 is used for transferring the recording sheets P. The sheet transfer path 22 extends upward from a rear part of the sheet feed cassette 20 along a back of the printer unit 2 and then curves toward the front side and then extends continuously to reach above the discharge tray 21. The sheet transfer path 22 is a C-shaped path.

The sheet feed roller 23 is provided at the rear part of the sheet feed cassette 20. The sheet feed roller 23 is pressed into contact with an uppermost one of the recording sheets P loaded on the sheet feed cassette 20. When the sheet feed roller 23 is rotated in the press-contact state, the uppermost recording sheet P receives a rotation force to be sent to the sheet transfer path 22.

The intermediate transcription unit 24 is provided on the sheet transfer path 22 at a position downstream from the sheet feed roller 23. The intermediate transcription unit 24 has an intermediate transcription belt 25 and belt rollers 26. The three belt rollers 26 support the intermediate transcription belt 25, and a turning motion of the intermediate transcription belt 25 is caused by the rotation of the belt rollers 26. The intermediate belt 25 contacts the photosensitive belt 27 during the turning motion. A toner image developed on the photosensitive belt 27 is transcribed on the intermediate transcription belt 25 by the contact. The toner image on the intermediate transcription belt 25 is then transcribed on the recording sheet P on the sheet transfer path 22 by an electric charge of the transfer rollers 28.

The photosensitive belt 27 is supported by three belt rollers 29, and a turning motion of the photosensitive belt 27 is caused by rotation of the belt rollers 29. During the turning motion, the photosensitive belt 27 is subjected to electrical charging, light exposure, and development so that the toner image is formed.

The electrical chargers 30 are disposed at positions under the photosensitive belt 27. The electrical chargers 30 are used for electrically charging a surface of the photosensitive belt 27 to a predetermined voltage by Colona charging. Other known electrical charging device such as a contact type roller charger and a brush charger may be used in place of the electrical chargers 30.

A laser scanner 31 is provided at a position downstream from the electrical chargers 30 in the turning motion of the photosensitive belt 27. The laser scanner 31 scans the surface of the electrically charged photosensitive belt 27 with laser based on the image data so as to form an electrostatic image on the photosensitive belt 27. Other known light exposure device such as a linear array light source may be used in place of the laser scanner 31.

The development unit 32 is provided at a position downstream from the laser scanner 31 in the turning motion of the photosensitive belt 27. The development unit 32 is formed of four development sections each containing a color toner. The development sections are aligned along a vertical direction, and colors of the color toners are cyan, magenta, yellow, and black. Each of the development sections of the development unit 32 has a case made from a synthetic resin, and the case is provided with a color toner, a development roller, and a supply roller, and the like. The color toners in the cases are supplied by the supply rollers to the development rollers and deposited on surfaces of the development rollers due to the electric charge. Then, the color toners move toward the electrostatic image of the photosensitive belt 27 from the development rollers to form the toner image. The toner image formed on the surface of the photosensitive belt 27 is transcribed on the intermediate transfer belt 25 as described above. Though the case of performing the image formation with the use of the four colors is described in this embodiment, only a black color toner is provided in the development unit 32 in the case of performing a monochrome image formation.

The cleaning unit 33 is disposed at a position downstream from the contact position of the intermediate transcription belt 25 and the photosensitive belt 27. The cleaning unit 33 has a cleaning blade to which a predetermined electrical charge is applied and a cleaning roller, for example. Residual color toners on the photosensitive belt 27 are removed from the photosensitive belt 27 by the cleaning unit 33.

The fixing unit 34 is disposed at a position downstream from the intermediate transcription belt 25 on the sheet transfer path 22. The fixing unit 34 has a thermal roller and a pressure roller opposed across the sheet transfer path 22. The toner image transcribed on the recording sheet P is melt and pressed by the fixing unit 34 to be fixed on the recording sheet P.

The discharge rollers 35 are disposed at a position downstream from the fixing unit 34 and most downstream of the sheet transfer path 22. The recording sheet P on which the toner image was fixed is nipped between the discharge rollers 35 to be discharged on the discharge tray 21 by a rotational force of the discharge rollers 35.

The image formation process of the printer unit 2 according to this embodiment can be modified when so required and is not limited to the electrophotographic method. For example, it is possible to employ an inkjet type or thermal type image formation process.

Figure 3:
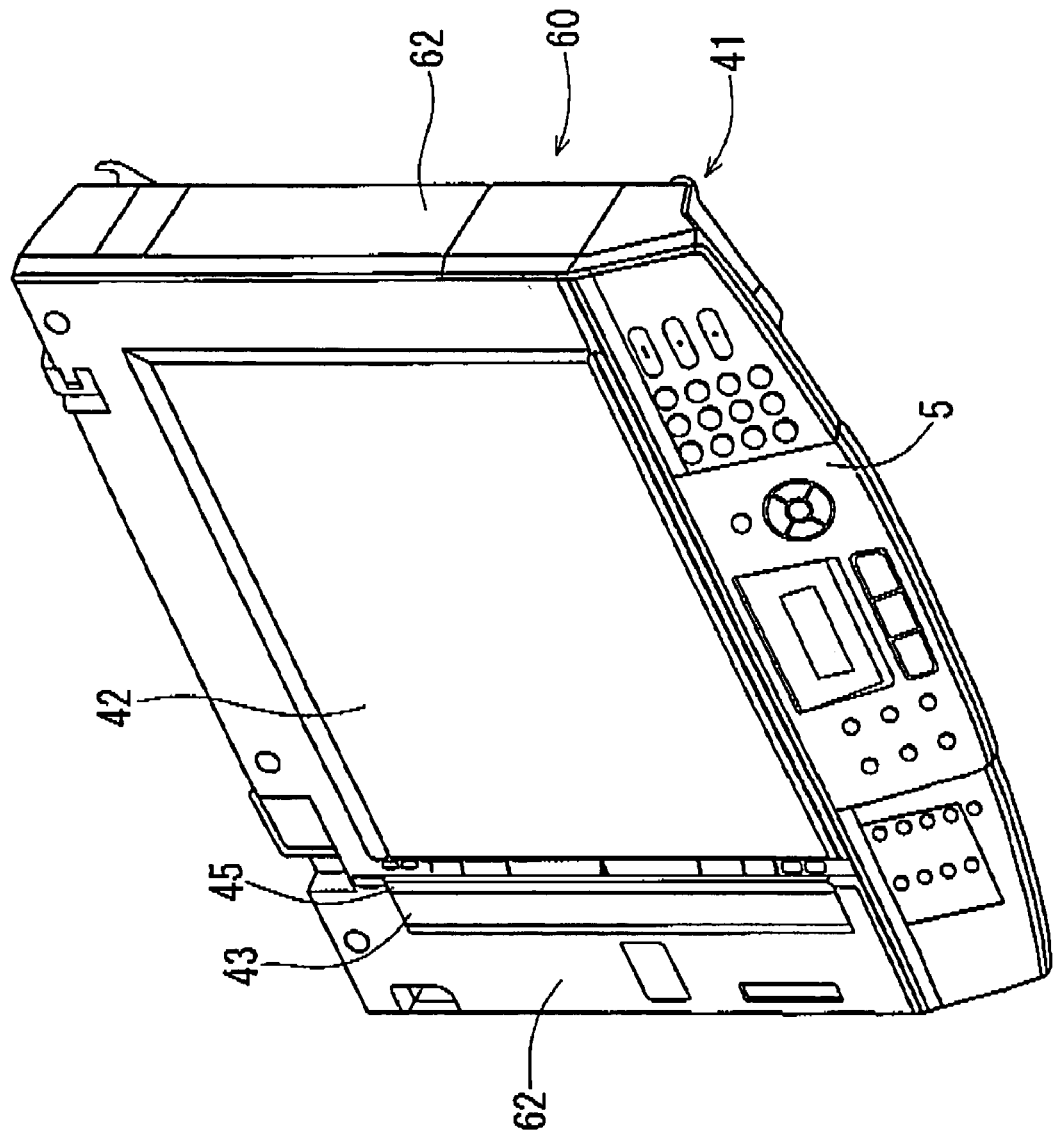
FIG. 3 is a perspective view showing a scanner unit 3 in a state where a document cover 40 is removed.
Figure 4:
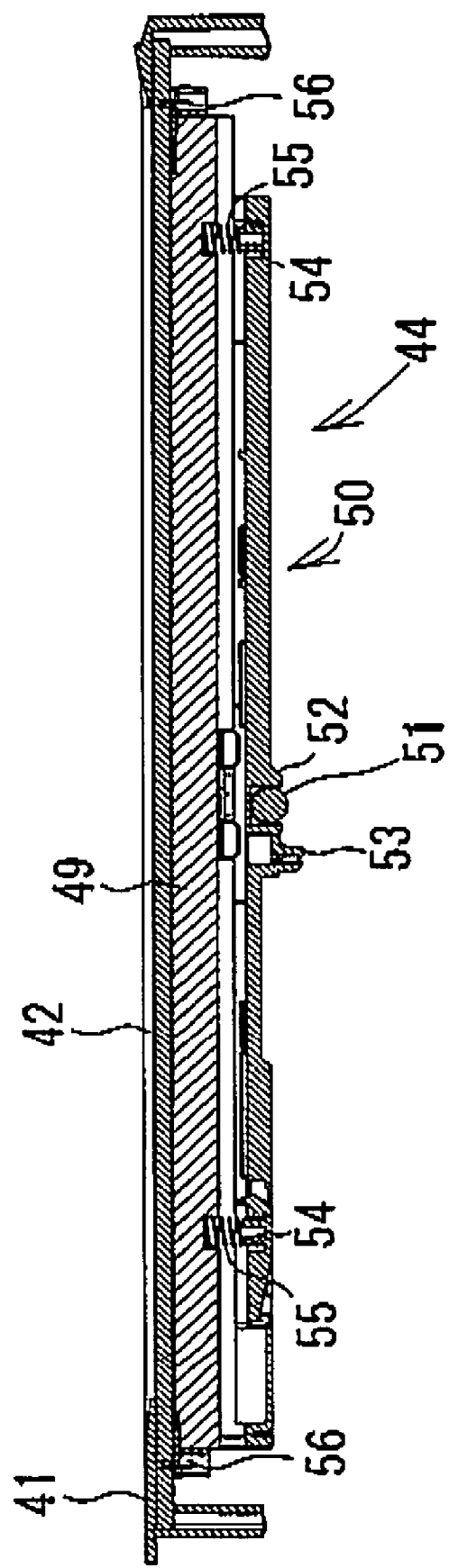
FIG. 4 is a sectional view showing an internal structure of the scanner unit 3.

FIG. 3 is a perspective view showing the scanner unit 3 from which the document cover is removed. FIG. 4 is a sectional view showing an internal structure of the scanner unit 3. In FIG. 4, the document cover 40 and a part of the casing 60 are omitted. Referring back to FIG. 1, the document cover 40 provided with the ADF 5 is attached to the document platform 41 by way of hinges on the rear side, the document platform 41 functioning as an FBS.

As shown in FIG. 3, platen glasses 42 and 43 are provided on the document platform 41 in such a fashion that the platen glasses 42 and 43 are exposed to a top face facing to the document cover 40. When the document cover 40 is opened, the platen glasses 42 and 43 are exposed. An overall top face of the document platform 41 including the platen glasses 42 and 43 is covered with the document cover 40 when the document cover 40 is closed. Though not shown, a holding member which is made from a sponge, a white sheet, and the like and used for holding a document placed on the platen glass 42 is provided on an underside of the document cover 40.

As shown in FIG. 4, the image reader 44 is built into the document platform 41. In the case of using the scanner unit 3 as the FBS, the document cover 40 is opened to place a document on the platen glass 42. It is possible to place a document having a size of A4 sheet or smaller on the platen glass 42. A document of a rectangular shape is placed on the platen glass 42 in such a fashion that a length thereof is in parallel to a width of the multifunction apparatus 1. When the document cover 40 is closed, the document is fixed on the platen glass 42. When the image reader 44 is moved along the platen glass 42, image reading of the document by the FBS is performed.

The platen glass 42 is used for placing a document thereon when the scanner unit 3 is used as the FBS and is made from a transparent glass plate or a transparent acryl plate, for example. An opening for exposing the platen glass 42 is formed at a center of the top face of the document platform 41. A part of the platen glass 42 exposed from the opening of the top face of the document platform 41 is a document reading part in the FBS.

The platen glass 43 is a reading position in the case of using the ADF 4 of the scanner 3 and made from a transparent glass plate or a transparent acryl plate, for example. The platen glass 43 extends in a direction of a depth of the multifunction apparatus 1 and in accordance with a length of a main scanning direction of the image reader 44.

A positioning member 45 is provided between the platen glasses 42 and 43. The positioning member 45 extends in the depth direction of the multifunction apparatus 1 and has the shape of a long flat plate. The positioning member 45 is used as a reference for positioning a document when the document is placed on the platen glass 42. Therefore, indications such as a center position and positions for both ends of document sizes such as A4 size and B5 size are provided on a top face of the positioning member 45.

As shown in FIG. 4, the image reader 44 is provided with a contact image sensor (hereinafter referred to as CIS) 49, a carriage 50, a guide shaft 51, and a belt driving mechanism (not shown). The CIS 49 is a contact type image sensor wherein light is emitted from a light source to irradiate a document with the light, and then light reflected from the document is guided to a photoelectric conversion element by a lens. The photoelectric conversion element outputs electric signals responsive to intensity of the reflected light. The CIS 49 being mounted on the carriage 50 reciprocates under the platen glass 42.

The carriage 50 is fitted to the guide shaft 51 provided along a width direction (a vertical direction of the drawing sheet of FIG. 4) of the document platform 41. The carriage 50 is driven by the belt driving mechanism and moved in such a fashion as to slide on the guide shaft 51. The CIS 49 is mounted on the carriage 50 in a manner that the CIS 49 is in the close contact to the underside of the platen glass 42. When the carriage 50 is moved on the guide shaft 51, the CIS 49 is moved in parallel to the platen glass 42.

More specifically, a shaft bearing unit 52 fitted to the guide shaft 51 in such a fashion as to stride the guide shaft 51 from above is formed on an underside of the carriage 50. The shaft bearing unit 52 and the guide shaft 51 are fitted to each other, so that the carriage 50 is supported by the guide shaft 51. The carriage 50 is slidable in an axial direction of the guide shaft 51 in this state. A belt holding member 53 projecting downward is disposed lateral to the shaft bearing unit 52. The belt holding unit 53 holds a timing belt of the belt driving mechanism to couple the timing belt to the carriage 50. Thus, a driving force is transmitted from the belt driving mechanism to the carriage 50, so that the carriage 50 reciprocates on the guide shaft 51.

A spring bearing 54 is formed on each of left and right points on an inner side of the carriage 50 as shown in FIG. 4. Coil springs 55 are provided between the CIS 49 and the carriage 50 and positioned by the spring bearings 54. The coil springs 55 bias the CIS 49 upward, so that the CIS 49 mounted on the carriage 50 is brought into close contact to the underside of the platen glass 42 in such a fashion as to be pressed against the underside of the platen glass 42. Rollers 56 are provided at opposite ends of the CIS 49. By rotation of the rollers 56, the CIS 49 pressed against the underside of the platen glass 42 moves smoothly along with a movement of the carriage 50 with the CIS 49 being in the close contact to the underside of the platen glass 42.

Though the CIS 49 is used as the image reader 44 in this embodiment, an optical image sensor such as a CCD may be used in place of the CIS 49.

Referring back to FIG. 1, the document cover 40 is provided with the ADF 4 for sequentially transferring documents from the document tray 46 to the document discharge tray 48 via a document transfer path. In the transfer process by the ADF 4, a document passes on the platen glass 43. When the document is passed to the platen glass 43, the image reader 44 disposed under the platen glass 43 reads an image of the document. In this invention, the ADF 4 has an arbitrary structure, and the scanner unit 3 may perform the image reading only as the FBS without being provided with the ADF 4. Therefore, detailed description of the ADF 4 is omitted in this specification.

Figure 5:
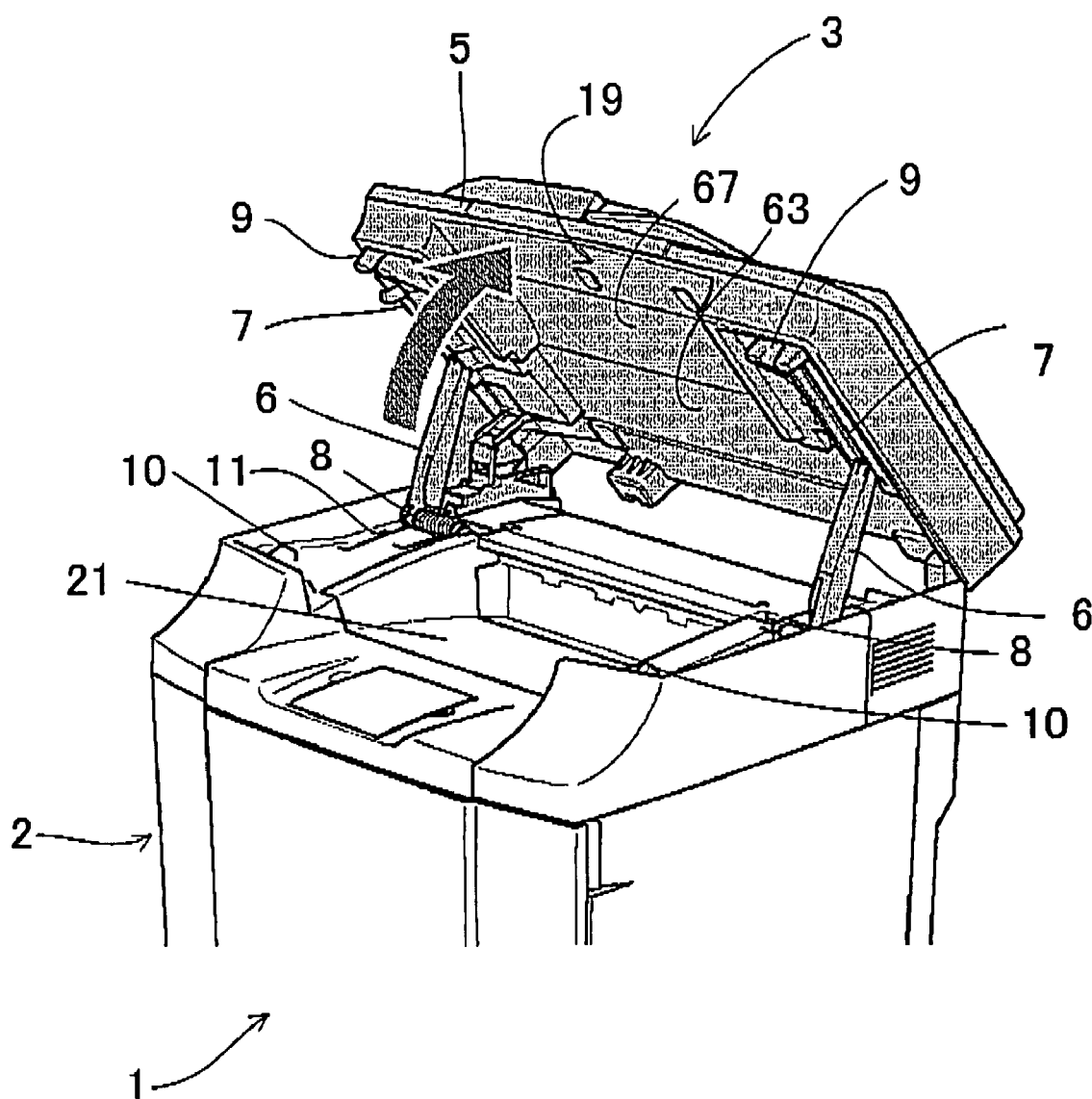
FIG. 5 is a diagram showing the scanner unit 3 when the scanner unit 3 is opened.

FIG. 5 is a diagram showing a state in which the scanner unit 3 is opened. The scanner unit 3 is opened/closed as shown in FIG. 5. In this specification, the status where the scanner unit 3 is lifted up is referred to as that the scanner unit is opened, and the status where the scanner unit 3 is shut on is referred to as that the scanner unit 3 is closed. The scanner unit 3 is connected to the printer unit 2 by way of a hinge mechanism at its rear side. Therefore, the scanner unit 3 is opened/closed in such a fashion as to rotate upward from the printer unit 2 with the rear side being a supporting point and a front side being a free end.

When the scanner unit 3 is opened, a space above the printer unit 2, i.e. the space defined between the printer unit 2 and the scanner unit 3, is opened. The discharge tray 21 provided on a main body of the printer unit 2 is opened/closed. By opening the discharge tray 21 in the state where the scanner unit 3 is opened, it is possible to access the internal part of the printer unit 2. The access to the internal part of the printer unit 2 is required for maintenance works such as jam processing and replacement of the photosensitive belt 27.

A support member 6 is provided at each of opposite ends of the top face of the printer unit 2. Each of the support members 6 is in the form of a long stick. A rear end of each of the support members 6 is rotatably supported by the top face of the printer unit 2. A front end of each of the support members 6 is slidably connected to a guide rail 7 formed on an underside of the scanner unit 3. Each of the support members 6 is biased by a coil spring 8 in a direction in which the scanner unit 3 is opened.

A locking mechanism for engaging the scanner unit 3 to the printer unit 2 when the scanner unit 3 is closed is provided on the front side of the printer unit 2 and the scanner unit 3. The locking mechanism has a pair of hooks 9 provided at a free end part, i.e. a front part, of the underside of the scanner unit 3, locking levers 10 provided for the hooks 9 on the front part of the top face of the printer unit 2.

An open/close sensor 11 for detecting whether the scanner unit 3 is opened or closed is provided on the top face of the printer unit 2. The open/close sensor 11 is an optical sensor which optically detects a detection element provided on the underside of the scanner unit 3 to detect whether the scanner unit 3 is opened or closed. The detection element is omitted in FIG. 5.

Referring back to FIG. 1, when the scanner unit 3 is closed, the hooks 9 are engaged to the locking levers 10. Thus, the scanner unit 3 is prevented from opening due to the biasing force of the support members 6, a slight external force, or the like, and the open/close sensor 11 is prevented from chattering. When the scanner unit 3 is lifted upward from the closed stated, the hooks 9 bend the locking levers 10 against the biasing force to release the engagement state of the hooks 9 and the locking levers 10. When the scanner unit 3 is lifted further upward, the scanner unit 3 is opened as shown in FIG. 5.

FIG. 6 is a perspective view showing the underside of the scanner unit 3. FIG. 7 is a sectional view showing a vertical section of the casing 60 of the document platform 41. In FIG. 7, the image reader 44 built into the document platform 41 is omitted.

The document platform 41 of the scanner unit 3 has the casing 60 provided with a base frame 61 and a cover 62. As shown in FIG. 7, the base frame 61 is formed of a base unit 63 forming a bottom plate of the casing 60, a side wall 64 upstanding from a periphery of the base unit 63, a partitioning plate 65 for partitioning a part in which the image reader 44 is disposed from a part in which a substrate of the operation panel 5 and the like are disposed, a supporting rib 66 for supporting the platen glass 42, and the like, which are formed integrally. Though the base frame 61 is provided with bosses for fixing various members with screws, through-holes for electrical wiring, and the like, detailed descriptions of these members are omitted in this specification since they are designed depending on a mode of embodiment of the document platform 41. The partitioning plate 65 is used also as a part of the supporting rib 66 supporting the platen glass 42 in this embodiment.

Referring back to FIG. 2, openings for exposing the platen glasses 42 and 43 are formed at the center of the cover 62. The platen glasses 42 and 43 are placed on the partitioning plate 65 and the supporting rib 66 of the base frame 61, and the cover 62 is fitted to the base frame 61 in such a fashion as to cover the platen glasses 42 and 43, thereby forming the casing 60 of the document platform 41. The platen glasses 42 and 43 are exposed as top faces of the casing 60 from the openings formed on the cover 62. The base frame 61 and the cover 62 may be synthetic resin molded articles, for example.

In the base frame 61, a part of the base unit 63 is recessed, and the recessed part corresponds to the discharge tray 21. The recessed part of the base unit 63 forms the recording sheet removal opening 19 opened on the front side of the apparatus. Since the space is formed above the discharge tray 21 of the printer unit 2 by the recessed part of the base unit 63, the recording sheets are discharged to the space to be retained by the discharge tray 21 when discharging image-recorded recording sheets to the discharge tray 21 disposed on the top face of the printer unit 2. The recording sheets retained on the discharge tray 21 are removed from the recording sheet removal opening 19 formed on the front side of the apparatus.

In this embodiment, the recording sheet removal opening 19 is formed at the center with respect to the width direction of the multifunction apparatus 1. In other words, the center with respect to a width direction of the base unit 63 is recessed, and parts on both sides of the recessed part of the base unit 63 are not recessed. On each of the non-recessed parts of the base unit 63, the guide rail 7 to which the relevant one of the support members 6 is slidably connected as described above is formed. The non-recessed parts (the opposed sides with respect to the width direction of the apparatus) of the base unit 63 are platform surfaces which contact the top face of the printer unit 2 when the scanner unit 3 is closed (see FIG. 1). Thus, since the scanner unit 3 is disposed in such a fashion that the non-recessed parts of the base unit 63 of the casing 60 contact the printer unit 2, a supporting force is generated at both sides of the casing 60 with respect to the width direction of the apparatus, thereby preventing the deformation otherwise caused by the load in the vertical direction.

A reinforcing portion 67 is formed on the recessed part of the base unit 63 of the casing 60. The reinforcing portion 67 may have an arch-like shape which is curved in such a fashion as to be swollen toward an internal space of the casing 60 and may extend continuously along the width direction of the apparatus (vertical direction of the drawing sheet in FIG. 7). The curved shape of the reinforcing portion 67 may be formed as a curved surface smoothly continues along the recording sheet discharge direction (horizontal direction in FIG. 7). In other words, since there is no corner or projection in the curved shape of the reinforcing portion 67, a recording sheet is not stopped even when the recording sheet is transferred with an edge thereof being in contact to the base unit 63 and the reinforcing portion 67. Thus, when the image-recorded recording sheet to be discharged on the discharge tray 21 contacts the reinforcing portion 67, paper jam is not caused by such contact.

As described in the foregoing, in the case of using the scanner unit 3 as the FBS, the document cover 40 is opened to place a document on the platen glass 42. After that, the document cover 40 is closed, and scanning of the document by the image reader 44 is performed in a state where the document is fixed on the platen glass 42. For example, in the case of reading an image of a two-page spread page of a heavy weight book, the book placed on the document platform 41 might be pressed strongly against the platen glass 42 without closing the document cover. The load in the vertical direction applied on the document platform 41 can be a force deforming the platen glass 42 or the casing 60 of the scanner unit 3. Particularly, the part under which the space is formed, i.e. the part of the bottom plate of the casing 60 facing to the discharge tray 21, is subject to such deformation since the part is not supported by the printer unit 2. However, since a rigidity of the part of the bottom plate is increased by the reinforcing portion 67 formed in the base unit 63, it is possible to prevent particularly the part recessed as the recording sheet removal opening 19 of the casing 60 from being deformed or damaged by the load in the vertical direction. Further, since the deformation of the casing 60 is prevented, it is possible to prevent the platen glass 42 from being deformed excessively, thereby preventing damages of the platen glass 42.

Also, since the reinforcing portion 67 does not project to the space above the discharge tray 21 nor segment the space, the reinforcing portion 67 does not interfere the recording sheets discharged to the discharge tray 21. Further, since the scanner unit 3 rotates independently from the discharge tray 21, the rotation of the scanner unit 3 does not cause the recording sheets retained on the discharge tray to fall.

Various modifications of this invention are of course possible. For example, a change of the shape of the reinforcing portion 67 to an angular shape or a projection shape projecting to the internal space of the casing 60 is not a deviation from this invention. Therefore, modifications in the spirit and the scope of this invention are encompassed by this invention.

What is claimed is:

1. A multifunction apparatus comprising:
   an image recording unit discharging on a discharge tray disposed on a top face thereof a recording medium on which an image has been recorded; and
   an image reading unit disposed on the image recording unit with a space being defined between the image reading unit and the discharge tray, wherein
   the image reading unit has a casing having a recording medium removal opening opened on a front side of the apparatus and formed by recessing a part of a bottom facing surface of a bottom plate corresponding to the discharge tray and a reinforcing portion recessed in such a fashion as to be swollen toward an internal space and formed on the bottom surface of the bottom plate forming the recording medium removal opening, the casing being provided in the image recording unit rotatably about a rear side of the apparatus in such a fashion as to open a front side of the apparatus.

2. The multifunction apparatus according to claim 1, wherein the recording medium removal opening is formed at a center with respect to a width direction of the apparatus.

3. The multifunction apparatus according to claim 1, wherein the casing has the reinforcing portion which is formed on the bottom plate forming the recording medium removal opening and has an arch-like shape curving along a direction in which the recording medium is discharged and extending over the width direction of the apparatus.

4. The multifunction apparatus according to claim 1, wherein the casing is formed of the bottom plate forming the recording medium removal opening and the reinforcing portion which form a curved shape curving smoothly and continuously along the direction in which the recording medium is discharged.

5. The multifunction apparatus according to claim 1, wherein the discharge tray is opened to provide access to an internal part of the image recording unit.

6. The multifunction apparatus according to claim 1, wherein the image reading unit is a flatbed scanner having an image sensor disposed reciprocatably in the casing and scanning a document placed on a platen glass.

\* \* \* \* \*